Patented Nov. 11, 1941

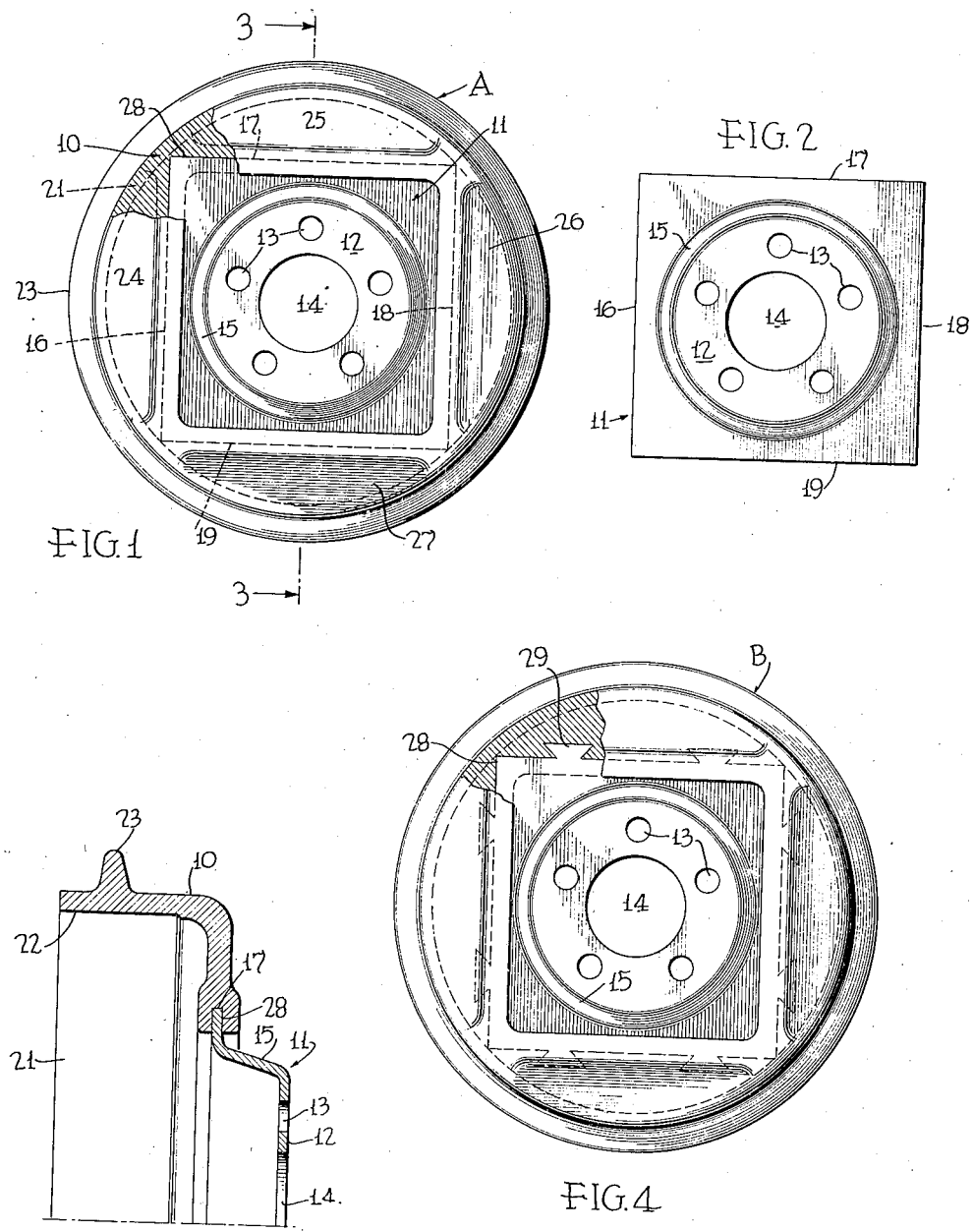

2,262,604

UNITED STATES PATENT OFFICE 2,262,604

COMPOSITE BRAKE DRUM

Carolus L. Eksergian, Detroit, Mich., assignor to Budd Wheel Company, Philadelphia, Pa., a corporation of Pennsylvania Application January 15, 1940, Serial No. 313,853

5 Claims. (Cl. 188—218)

This invention in general relates to brake drums and more particularly to a composite brake drum of the type wherein the cast brake ring is secured to the hub of the wheel by a backing or mounting plate.

The object of this invention is to provide a brake drum of a design and construction affording a substantial saving in the amount of drum head or backing plate metal customarily required in brake drums of this class, while providing a permanent, fused bond between the cast brake ring and the said backing plate.

Another object is to provide an improved method for manufacturing brake drums with a view to effecting a substantial saving in material and cost of manufacture.

Other objects and advantages residing in the design and construction of the present brake drum and the method of making same will appear more fully in the hereinafter description, and will be best understood by reference to the accompanying drawing wherein:

Figure 1 is an elevational view of an embodiment of the invention, with portions broken away for better illustration;

Figure 2 is an elevational view of the backing or mounting plate to which the brake ring is fastened, as shown in Figure 1;

Figure 3 is an enlarged, transverse sectional view of one-half of the drum, as taken on the line, and as viewed in the direction of the arrows 3—3 of Fig. 1; and Figure 4 is a view similar to Fig. 1 of a slightly modified form of the invention.

Referring now to the drawing wherein similar characters of reference indicate corresponding parts in the several views depicting two forms of the invention, the letter A designates a composite brake drum embodying one form of the invention, and illustrated in Figure 1.

The brake drum A comprises generally a brake ring 10 and an attached drum head or backing plate 11. The drum head 11 is a stamping fabricated at one operation from a blank, preferably composed of cold-rolled sheet metal, such as steel, and is provided with a dish-shaped body portion 12, having bolt-receiving holes 13 and the central hub-receiving opening 14. The dish-shaped body portion 12 is integrally formed with an angularly-directed annular portion 15, terminating in square flanges 16, 17, 18 and 19 which, as hereinafter described, are embedded into and fused with adjacent portions of the brake ring 10.

The brake ring 10, as best shown in Fig. 3, includes the main body or annular portion 21 having the internal braking surface 22 and the exterior stiffening and cooling rib 23. The body portion 21 of the brake ring is directed radially inward at opposite sides of its periphery to form quandrantal segments 24, 25, 26 and 27 into whose rectilinear edges or margins, the square flanges 16, 17, 18 and 19 of the drum head 11 are embedded and fused, as at 28.

The composite brake drum A, it is understood, is formed by casting metal against the straight edge flanged portions of the stamped or pressed metal drum head or backing plate 11 shown in Figure 2, in the customary mould (not shown); whereby the drum head stamping 11 is permanently embedded in and fused to the brake ring 10.

Heretofore, it has been the practice to form the drum head or backing plate as a disc with a periphery provided with dovetail projections, with a view to a permanent and rigid bond to the adjacent brake ring. By substituting a square drum head, it is obvious that an appreciable amount of the comparatively valuable drum head material can be saved and replaced by the cheaper cast metal of the brake ring. This saving will be better understood by considering the amount of material left from a square sheet of material after punching a disc therefrom having a diameter equal to that of the said square. In view of the vast quantities of drum head material required in the automobile industry, such a saving per brake drum may constitute an appreciable factor in their economical production.

In the slightly modified form of the invention, shown in Figure 4, the details of construction composing the brake drum, therein designated by the letter B, are substantially the same as those described in connection with the form shown in Figures 1 to 3 inclusive, save for the addition of the dovetails, as at 29, which may be formed on the drum head during the process of initial stamping, the said dovetails being embedded in corresponding recesses formed in the brake ring when cast thereagainst.

It is to be understood that the invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention; and it will be further understood that each and every novel feature and combination present in or possessed by the mechanism herein disclosed, forms a part of the invention included in the application.

What I claim is:

1. A composite brake drum of the character described, comprising in combination, a cast metal brake ring, a drum head arranged within the ring and having a polygonal but non-circular, flanged periphery, means on said drum head to receive fastening elements and a hub; and segmental portions projecting inwardly from the inner periphery of the ring and fused to the said flanged periphery of the drum head.

2. A composite drum head of the character described, comprising, in combination, a cast metal brake ring, a drum head arranged within the ring and having a rectilinear periphery, means on said drum head to receive fastening elements and a hub; and segmental portions projecting inwardly from opposite quadrants of the ring and fused to the said rectilinear periphery of the drum head.

3. A composite drum head of the character described, comprising, in combination, a drum head composed of sheet metal and having a hub-receiving portion, an annular portion integrally formed with and arranged in angular relation to the hub-receiving portion, said annular portion terminating in square, flanged edges; a brake ring encircling said drum head, said brake ring having inwardly-directed, square portions, and a fused connection between the square portions of the brake ring and the square edges of the annular portion.

4. A composite brake drum of the character described, comprising, in combination, a drum head composed of sheet metal and formed to accommodate fastening means and provide a hub-receiving portion, an annular portion projecting angularly from and integrally formed with the hub-receiving portion, a plurality of flanged means extending outwardly from and fastened to the annular portion, said flanged means having square edges, a brake ring encircling said drum head having parts arranged as quadrants on the inner side of said brake ring and fused to the said flanged means.

5. In a composite brake drum of the character described, the combination of a brake ring, a drum head arranged within said brake ring, means on the drum head including flanges for fastening the drum head to the ring; said ring having integral, inwardly-projecting segmental portions arranged as quadrants within the ring and fused to the flanges of the drum head, whereby a permanent bond is established between the ring and the drum head and a substantial saving of drum head material is effected.

CAROLUS L. EKSERGIAN.